(12) United States Patent
Masaki

(10) Patent No.: US 8,295,828 B2
(45) Date of Patent: Oct. 23, 2012

(54) MOBILE TERMINAL, MOBILE COMMUNICATION SYSTEM, BASE STATION SEARCHING METHOD, AND STORAGE MEDIUM STORING BASE STATION SEARCHING PROGRAM

(75) Inventor: Masashi Masaki, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 382 days.

(21) Appl. No.: 12/662,191

(22) Filed: Apr. 5, 2010

(65) Prior Publication Data

US 2010/0254359 A1     Oct. 7, 2010

(30) Foreign Application Priority Data

Apr. 6, 2009   (JP) ................. 2009-091937

(51) Int. Cl.
*H04W 48/16*     (2009.01)
*H04W 92/18*     (2009.01)

(52) U.S. Cl. .................... 455/426.1; 455/434

(58) Field of Classification Search ............ 455/426.1, 455/434
See application file for complete search history.

(56) References Cited

U.S. PATENT DOCUMENTS

| | | | |
|---|---|---|---|
| 5,896,572 A * | 4/1999 | Scotton ............... | 455/452.1 |
| 6,393,006 B1 * | 5/2002 | Kajihara ............... | 370/335 |
| 2006/0286977 A1 * | 12/2006 | Khandelwal et al. ..... | 455/432.1 |
| 2010/0234021 A1 * | 9/2010 | Ngai et al. ............. | 455/433 |

FOREIGN PATENT DOCUMENTS

JP     2007-116561 A     5/2007

* cited by examiner

*Primary Examiner* — Melvin Marcelo

(74) *Attorney, Agent, or Firm* — McGinn IP Law Group, PLLC

(57) ABSTRACT

A first mobile terminal forming a mobile communication system connects to a base station by using a first wireless communication method (for example, GSM method). Further, a second mobile terminal acquires unique information of the base station (for example, cell information) from the first mobile terminal by communication with the first mobile terminal by using a second wireless communication method (for example, wireless LAN method), and searches a transmission frequency of the base station included in the unique information.

13 Claims, 6 Drawing Sheets

| NAME OF FREQUENCY BAND | NUMBER OF RADIO CHANNELS ALLOCATED |
|---|---|
| GSM 850 (USING 850 MHz BAND) | 125 |
| GSM 900 (USING 900 MHz BAND) | 175 |
| DCS 1800 (USING 1800 MHz BAND) | 375 |
| PCS 1900 (USING 1900 MHz BAND) | 300 |
| | TOTAL NUMBER OF CHANNELS : 975 |

Fig. 5

MOBILE TERMINAL, MOBILE COMMUNICATION SYSTEM, BASE STATION SEARCHING METHOD, AND STORAGE MEDIUM STORING BASE STATION SEARCHING PROGRAM

INCORPORATION BY REFERENCE

This application is based upon and claims the benefit of priority from Japanese patent application No. 2009-091937, filed on Apr. 6, 2009, the disclosure of which is incorporated herein in its entirety by reference.

BACKGROUND OF THE INVENTION

1. Field of the Invention

The present invention relates to a mobile terminal, a mobile communication system, a base station searching method, and a storage medium which stores a base station searching program, and particularly to a technology which reduces the time required for a base station search (hereinafter, referred to as base station search time).

2. Description of Related Art

In a mobile communication system, a plurality of radio channels are applied to wireless communication between mobile terminals such as mobile phones and base stations. For example, as shown in FIG. 5, in wireless communication based on GSM (Global System for Mobile communications) method, a plurality of frequency bands composed of GSM 850 (using 850 MHz band), GSM 900 (using 900 MHz band), DCS (Digital Communication System) 1800 (using 1800 MHz band) and PCS (Personal Communication Service) 1900 (using 1900 MHz band) are used. Further, the numbers of radio channels allocated to GSM 850, GSM 900, DCS 1800 and PCS1900 are respectively "125", "175", "375" and "300", so that total number of the radio channels runs to "975".

Therefore, a general mobile terminal searches all radio channels applied to the mobile communication system for the sake of detecting a connectable base station, upon power activation or preparing for return to an in-service area. Specifically, as shown in FIG. 6, when the power is activated (step S11), the mobile terminal sequentially searches all radio channels one by one (steps S12 to S14). Then, the mobile terminal executes a connection process (timing synchronization, location registration and the like) to a base station which uses the radio channel obtained by the above-mentioned search (step S15). Note that the mobile terminal periodically executes the base station searching process shown at the above-mentioned steps S12 to S14, upon being in an out-of-service state (upon being located in an out-of-service area).

However, the above-mentioned mobile terminal has a problem that the base station search time is long, so that convenience for a user using the mobile terminal is reduced. For example, when it takes about "5 msec" for the search per channel in a mobile communication system to which the GSM method is applied, the base station search time becomes about "5 sec" (≈5 msec*975 channels).

A mobile terminal addressing this problem is disclosed in e.g. Japanese Unexamined Patent Application Publication No. 2007-116561 (Ito). This mobile terminal disclosed by Ito searches only a radio channel obtained by the previous search upon a base station search to prepare for the return to the in-service area, thereby reducing the base station search time.

SUMMARY

However, the present inventor has found a problem as follows. That is, according to Ito mentioned above, it is difficult to sufficiently achieve the reduction effect of the base station search time. This is because it is still necessary to make all radio channels the search target upon the power activation and a connection to a new base station, so that it takes the same base station search time as that of the general mobile terminal, while Ito is effective upon return to the in-service area of the base station previously detected.

A first exemplary aspect of the present invention is a mobile terminal including an acquisition unit that acquires unique information of a base station using a first wireless communication method and capable of being connected by its own mobile terminal, from a different mobile terminal being connected to the base station, by communication with the different mobile terminal by using a second wireless communication method, and a search unit that searches a transmission frequency of the base station included in the unique information.

A second exemplary aspect of the present invention is a mobile terminal including a connection unit that connects to a base station by using a first wireless communication method, and a notification unit that notifies unique information including a transmission frequency of the base station to a different mobile terminal requiring the unique information, by communication with the different mobile terminal by using a second wireless communication method.

A third exemplary aspect of the present invention is a mobile communication system including a base station, a first mobile terminal that connects to the base station by using a first wireless communication method, and a second mobile terminal that acquires unique information of the base station from the first mobile terminal by communication with the first mobile terminal by using a second wireless communication method, and searches a transmission frequency of the base station included in the unique information.

A fourth exemplary aspect of the present invention is a base station searching method that provides a method of searching a base station in a mobile terminal. This base station searching method includes acquiring unique information of a base station using a first wireless communication method and capable of being connected by the mobile terminal, from a different mobile terminal being connected to the base station, by communication with the different mobile terminal by using a second wireless communication method, and searching a transmission frequency of the base station included in the unique information.

A fifth exemplary aspect of the present invention is a storage medium that stores a base station searching program for causing a mobile terminal to execute a process to acquire unique information of a base station using a first wireless communication method and capable of being connected by the mobile terminal, from a different mobile terminal being connected to the base station, by communication with the different mobile terminal by using a second wireless communication method, and a process to search a transmission frequency of the base station included in the unique information.

Namely, in the present invention, a frequency of a radio channel used by a base station is shared between mobile terminals, so that the number of target radio channels for search is reduced. Therefore, it is possible to substantially reduce the base station search time. Further, this reduction effect is uniformly achieved regardless of whether or not the return to the in-service area of the base station previously detected, in contrast to Ito mentioned above.

According to the present invention, it is possible to further reduce the base station search time. Therefore, it is possible to improve convenience for a user. Further, it is possible to reduce power consumption of the mobile terminal upon the base station search, so that it is possible to extend the standby time of the mobile terminal, to decrease the capacity of a battery or the like mounted in the mobile terminal to reduce the cost and size thereof, and the like.

BRIEF DESCRIPTION OF THE DRAWINGS

The above and other exemplary aspects, advantages and features will be more apparent from the following description of certain exemplary embodiments taken in conjunction with the accompanying drawings, in which:

FIG. 5 is a table showing an example of the application of radio channels in a general mobile communication system.

DESCRIPTION OF THE EXEMPLARY EMBODIMENTS

Figure 1:
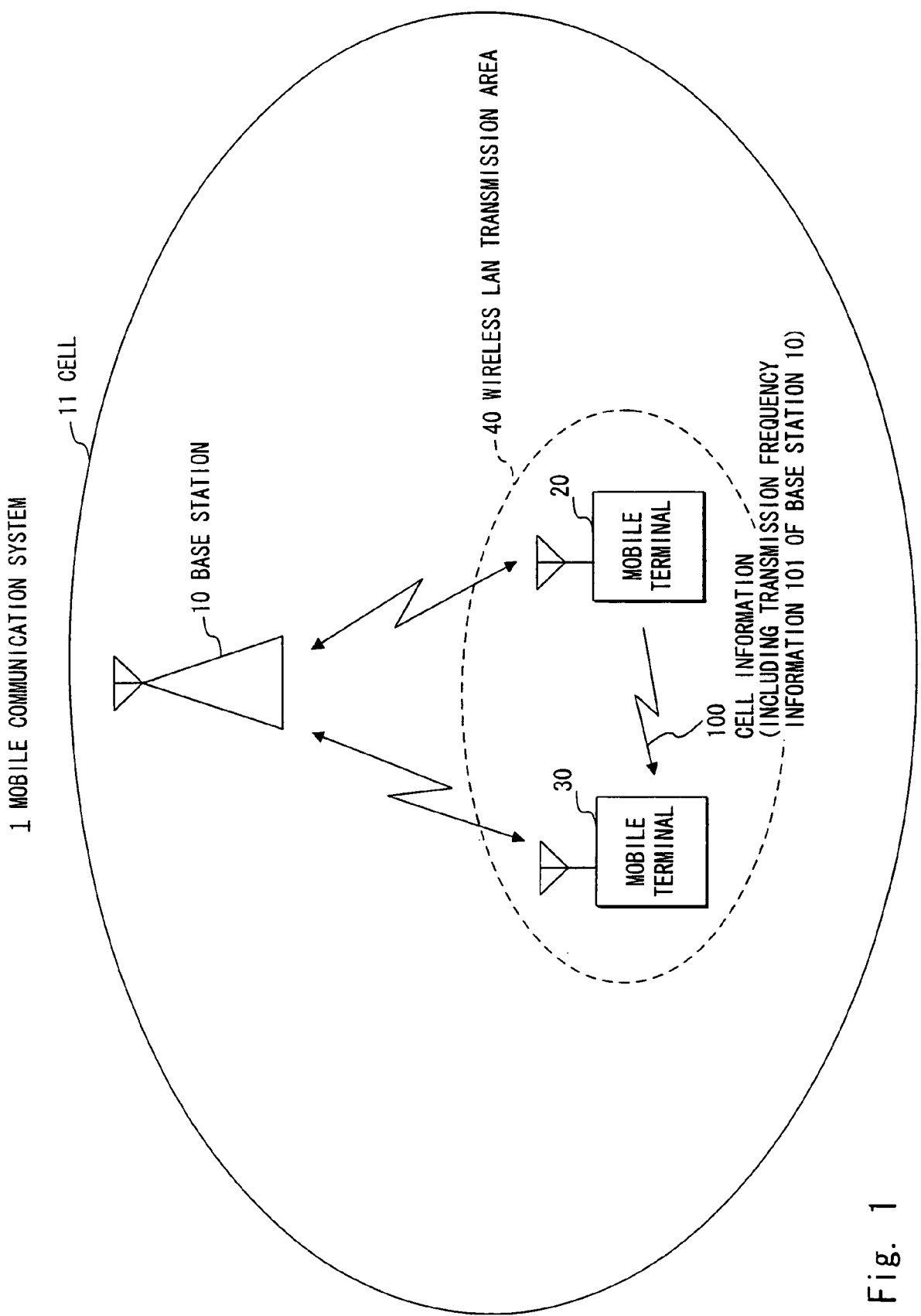
FIG. 1 is a block diagram showing a configuration example of a mobile communication system according to an exemplary embodiment of the present invention.

Hereafter, an exemplary embodiment of a mobile terminal according to the present invention and a mobile communication system to which the mobile terminal is applied will be described with reference to FIGS. 1 to 4. Note that in the drawings, identical components are denoted by identical reference numerals, and duplicative description is omitted as necessary for the clarity of the description.

As shown in FIG. 1, a mobile communication system 1 according to this exemplary embodiment includes a base station 10, a mobile terminal 20 and a mobile terminal 30. Wireless communication based on e.g. the GSM method is performed between the base station 10 and the mobile terminals 20 and 30. Further, the mobile terminal 30 acquires information (hereinafter, referred to as cell information) 100 regarding a cell 11 formed by the base station 10 from the mobile terminal 20 which has been connected to the base station 10, based on e.g. a wireless LAN (Local Area Network) method prescribed by IEEE (Institute of Electrical and Electronics Engineers) 802.11.

The cell information 100 includes transmission frequency information 101 of the base station 10. The transmission frequency information 101 indicates, for example, which frequency (radio channel) is used and how strong radio wave is emitted by the base station 10. The mobile terminal 30 searches the radio channel indicated by the transmission frequency information 101. Therefore, the base station search time can be substantially reduced. Note that although the illustration is omitted, the cell information 100 includes various kinds of information necessary for a connection process to the base station 10 in addition to the transmission frequency information 101. Further, the transmission frequency information 101 may include information regarding several radio channels preferable to be included in the search target for the mobile terminal 30 (for example, a radio channel used by a neighboring base station of the base station 10), in addition to the information regarding the radio channel used by the base station 10. Even in this case, the base station search time is substantially reduced compared to that in a case where all radio channels are searched.

Further, a radius of a transmission area 40 (transmission distance) by the wireless LAN method is extremely shorter than a radius of the cell 11 (transmission distance by the GSM method). Therefore, the mobile terminal 30 can certainly acquire only the transmission frequency information 101 of the base station 10 on which its own mobile terminal is actually camped.

Furthermore, it is preferable to use IEEE 802.11b, 802.11g and the like, which can be used outdoors, as the wireless LAN method. In this case, the mobile terminal 30 can acquire the transmission frequency information 101 even when the mobile terminal 30 is about "50 m" away from the mobile terminal 20.

Hereafter, specific configuration examples of the mobile terminals 20 and 30, and an operation example thereof will be described in detail with reference to FIGS. 2 to 4. Note that as the base station 10, a general base station is used. Therefore, the explanations of the configuration and the operation of the base station 10 are omitted.

Figure 2:
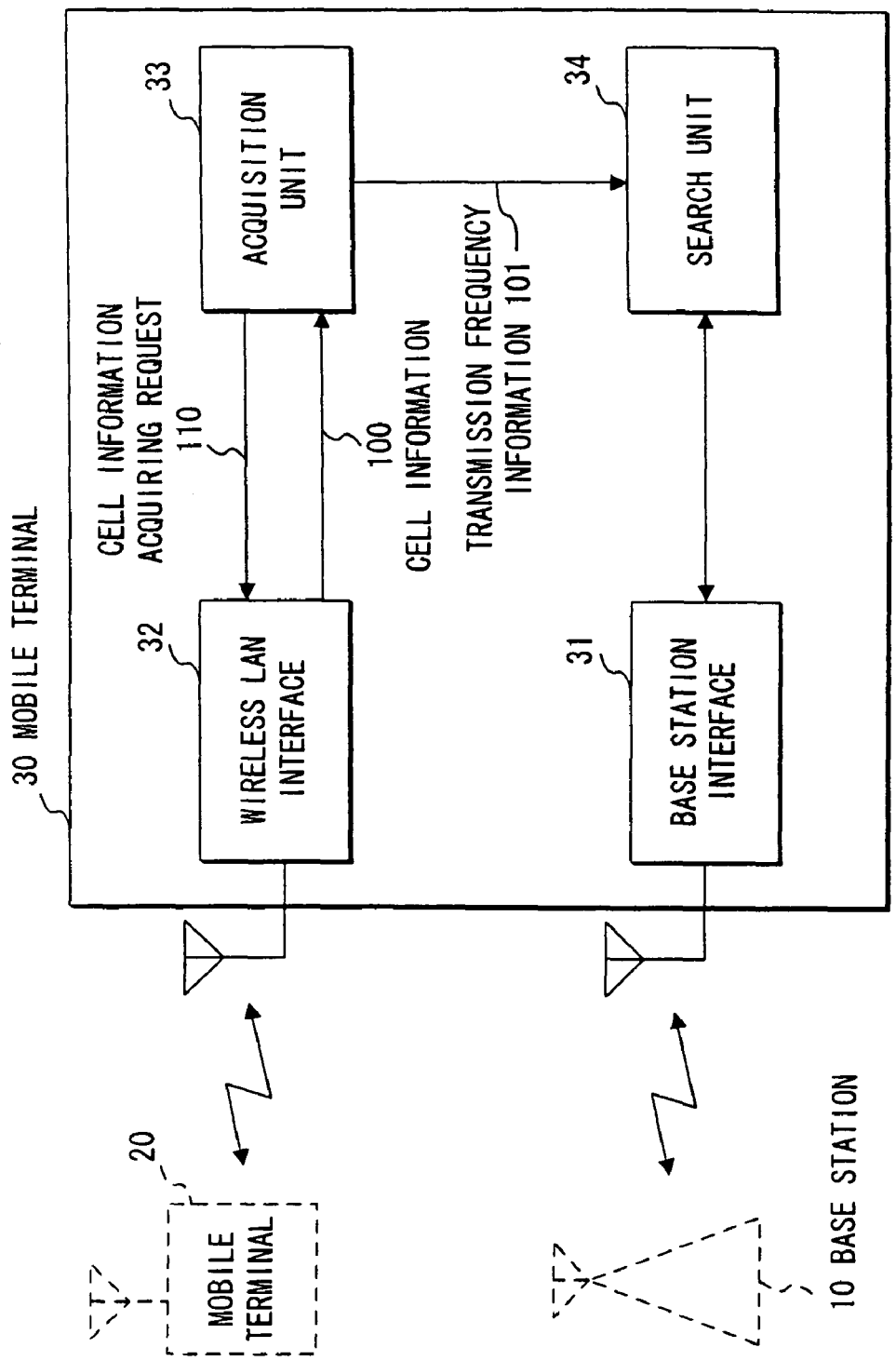
FIG. 2 is a block diagram showing one configuration example of a mobile terminal according to an exemplary embodiment of the present invention.

As shown in FIG. 2, the mobile terminal 30 includes a base station interface 31, a wireless LAN interface 32, an acquisition unit 33, and a search unit 34. Note that although the illustration is omitted, the mobile terminal 30 also includes a connection unit which executes the connection process to the base station 10.

The base station interface 31 has a function of demodulating a radio signal received from the base station 10 and a function of modulating various data generated within the mobile terminal 30 to be transmitted as a radio signal, as with a transceiver mounted in the general mobile terminal.

Further, the wireless LAN interface 32 has a function of transmitting and receiving a radio frame based on the wireless LAN method, as with a general wireless LAN communication terminal.

Further, the acquisition unit 33 broadcasts a request 110 for acquiring the cell information 100 through the wireless LAN interface 32 to the wireless LAN transmission area 40 shown in FIG. 1. At this time, if the mobile terminal 20 exists in the wireless LAN transmission area 40, the acquisition unit 33 receives from the mobile terminal 20 the cell information 100 as a response to the cell information acquiring request 110. Furthermore, the acquisition unit 33 extracts from the cell information 100 the transmission frequency information 101 to be provided to the search unit 34. Note that the cell information 100 and the cell information acquiring request 110 can be included in a payload in the radio frame and easily transmitted. Therefore, there is no necessity of changing the existing protocol.

Furthermore, the search unit 34 controls the base station interface 31 to search the radio channel indicated by the transmission frequency information 101.

Figure 3:
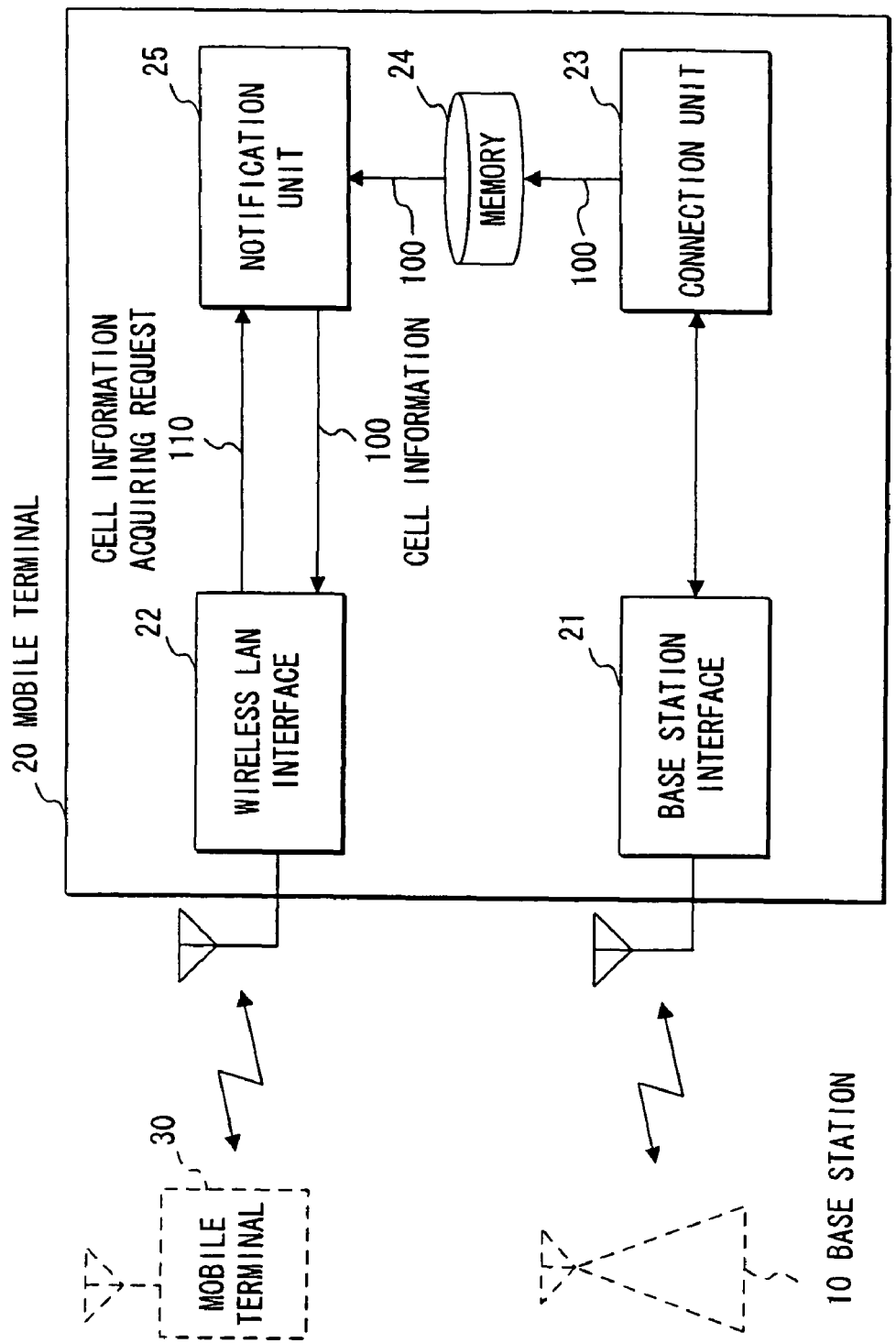
FIG. 3 is a block diagram showing another configuration example of a mobile terminal according to an exemplary embodiment of the present invention.

On the other hand, as shown in FIG. 3, the mobile terminal 20 includes a base station interface 21 and a wireless LAN interface 22, which are similar to those of the mobile terminal 30, a connection unit 23, a memory 24, and a notification unit 25.

The connection unit 23 controls the base station interface 21 to execute the connection process to the base station 10, and stores the cell information 100 obtained by this connection process in the memory 24.

Further, the notification unit 25 receives the cell information acquiring request 110 from the mobile terminal 30 through the wireless LAN interface 22. At this time, the notification unit 25 reads from the memory 24 the cell information 100 to be notified to the mobile terminal 30 through the wireless LAN interface 22.

Next, an example of a base station searching process by a cooperative operation between the mobile terminals 20 and 30 will be described with reference to FIG. 4.

Figure 4:
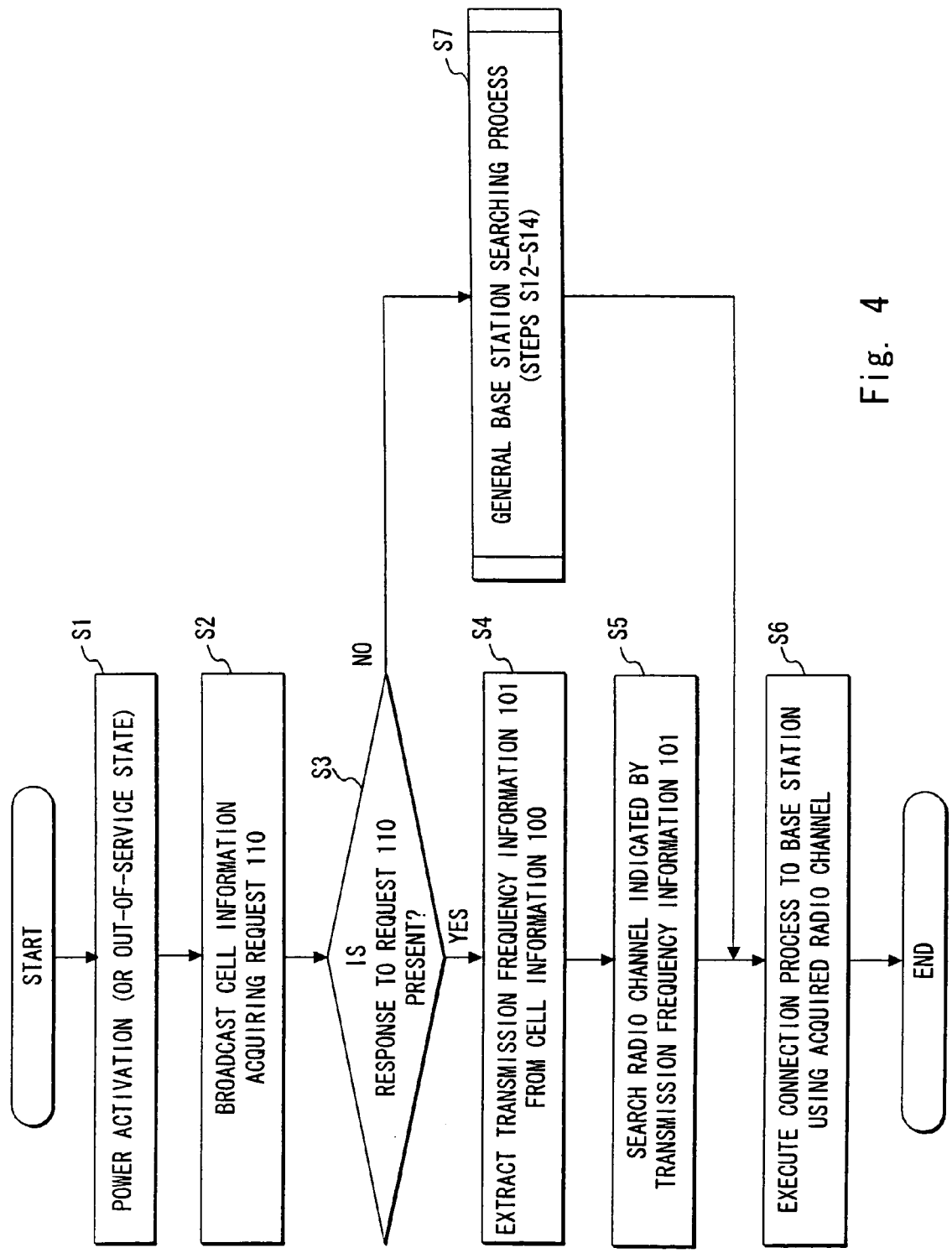
FIG. 4 is a flowchart showing an example of a base station searching process in a mobile terminal according to an exemplary embodiment of the present invention.

As shown in FIG. 4, when power of the mobile terminal 30 is activated (or when the mobile terminal 30 is in the out-of-service state) (step S1), the acquisition unit 33 in the mobile terminal 30 broadcasts the cell information acquiring request 110 through the wireless LAN interface 32 (step S2).

Then, the acquisition unit 33 waits for the response to the cell information acquiring request 110 (namely, the reception of the cell information 100) (step S3).

On the other hand, when the cell information acquiring request 110 is received, the notification unit 25 in the mobile terminal 20 returns the cell information 100 read from the memory 24 to the mobile terminal 30. The acquisition unit 33 in the mobile terminal 30 extracts from the cell information 100 the transmission frequency information 101 to be provided to the search unit 34 (step S4).

The search unit 34 instructs the base station interface 31 to search the radio channel indicated by the transmission frequency information 101 (step S5). Then, the connection unit (not shown) in the mobile terminal 30 executes the connection process to the base station 10 which uses the radio channel acquired by the search unit 34 (step S6).

Thus, in this exemplary embodiment, the base station search time can be substantially reduced compared to those of the general mobile terminal and the above-mentioned mobile terminal disclosed by Ito. Specifically, the base station search time is a sum of a search time per channel and a transmission time of the cell information 100. However, in a case where the frame length of the radio frame (header length+information length of the cell information 100) is set to "160 bits" and the radio frame is transmitted at the maximum rate (about 11 Mbps) prescribed by the IEEE 802.11b, the transmission time of the cell information 100 is about "1.5 pec". Therefore, a proportion of the transmission time of the cell information 100 to the base station search time is vanishingly small. Accordingly, considering an example where the GSM method is applied to the mobile communication system 1, the base station search time (about 5 msec (search time per channel)) in this exemplary embodiment is one thousandth of each base station search time (about 5 sec) in the general mobile terminal and the above-mentioned mobile terminal disclosed by Ito.

Figure 6:
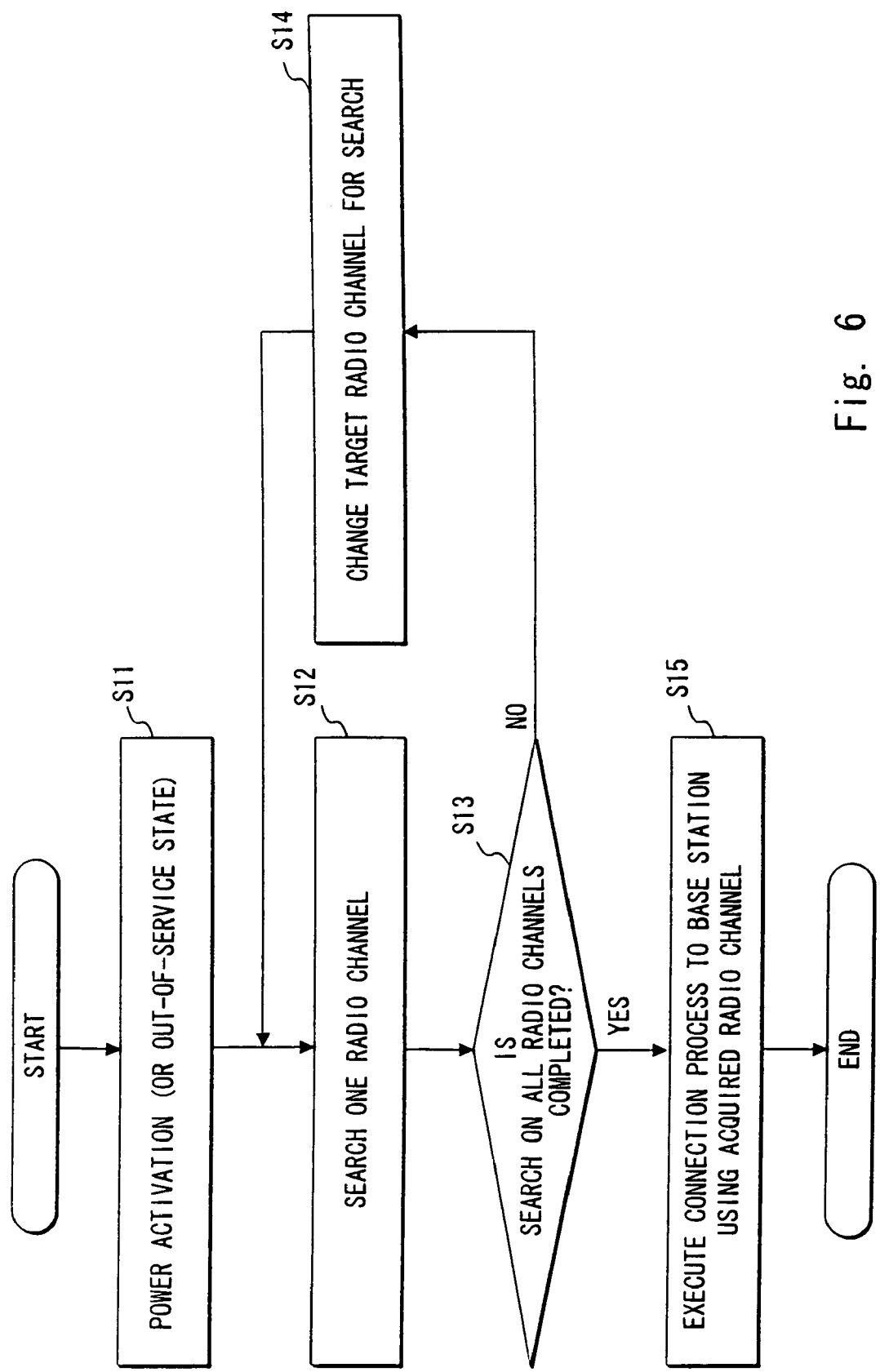
FIG. 6 is a flowchart showing an example of a base station searching process in a general mobile terminal.

Further, when the response to the cell information acquiring request 110 is not obtained at the above-mentioned step S3, the search unit 34 executes the general base station searching process shown at the steps S12 to S14 in FIG. 6 (step S7). Therefore, the mobile terminal 30 can connect to the base station 10 even when the mobile terminal 20 does not exist in the wireless LAN transmission area 40.

While the invention has been described in terms of several exemplary embodiments, those skilled in the art will recognize that the invention can be practiced with various modifications within the spirit and scope of the appended claims and the invention is not limited to the examples described above. For example, it is also possible to provide a program for causing a mobile terminal to execute each process described in the above-mentioned exemplary embodiment. In this case, it is preferable to store the program in a storage medium such as a memory, so that a processor in the mobile terminal can execute the program. Alternatively, the program may be provided as a plug-in for firmware installed on the existing communication controlling circuit.

Further, the scope of the claims is not limited by the exemplary embodiments described above.

Furthermore, it is noted that, Applicant's intent is to encompass equivalents of all claim elements, even if amended later during prosecution.

What is claimed is:

1. A mobile terminal comprising:
   an acquisition unit that acquires unique information of a base station using a first wireless communication method and capable of being connected by its own mobile terminal, from a different mobile terminal being connected to the base station, by communication with the different mobile terminal by using a second wireless communication method; and
   a search unit that searches a transmission frequency of the base station included in the unique information.

2. The mobile terminal according to claim 1, wherein a transmission distance by the second wireless communication method is shorter than a transmission distance by the first wireless communication method.

3. The mobile terminal according to claim 2, wherein the second wireless communication method is a wireless LAN (Local Area Network) method prescribed by IEEE (Institute of Electrical and Electronics Engineers) 802.11.

4. The mobile terminal according to claim 1, wherein the search unit searches all transmission frequencies that can be used by the base station when the unique information is not acquired by the acquisition unit.

5. A mobile terminal comprising:
   a connection unit that connects to a base station by using a first wireless communication method; and
   a notification unit that notifies unique information including a transmission frequency of the base station to a different mobile terminal requiring the unique information, by communication with the different mobile terminal by using a second wireless communication method.

6. The mobile terminal according to claim 5, wherein a transmission distance by the second wireless communication method is shorter than a transmission distance by the first wireless communication method.

7. The mobile terminal according to claim 6, wherein the second wireless communication method is a wireless LAN method prescribed by IEEE 802.11.

8. A mobile communication system comprising:
   a base station;
   a first mobile terminal that connects to the base station by using a first wireless communication method; and
   a second mobile terminal that acquires unique information of the base station from the first mobile terminal by communication with the first mobile terminal by using a second wireless communication method, and searches a transmission frequency of the base station included in the unique information.

9. A base station searching method in a mobile terminal, comprising:
   acquiring unique information of a base station using a first wireless communication method and capable of being connected by the mobile terminal, from a different mobile terminal being connected to the base station, by communication with the different mobile terminal by using a second wireless communication method; and
   searching a transmission frequency of the base station included in the unique information.

10. The base station searching method according to claim 9, wherein as the second wireless communication method, a wireless communication method where a transmission distance is shorter than a transmission distance by the first wireless communication method is used.

11. The base station searching method according to claim 10, wherein as the second wireless communication method, a wireless LAN method prescribed by IEEE 802.11 is used.

12. The base station searching method according to claim 9, wherein all transmission frequencies that can be used by the base station are searched when the unique information cannot be acquired from the different mobile terminal.

13. A storage medium that stores a base station searching program for causing a mobile terminal to execute:

a process to acquire unique information of a base station using a first wireless communication method and capable of being connected by the mobile terminal, from a different mobile terminal being connected to the base station, by communication with the different mobile terminal by using a second wireless communication method; and a process to search a transmission frequency of the base station included in the unique information.

* * * * *